H. DLUGACH.
SHOPPING CARD FOR USE IN RETAILING GOODS BY SAMPLES.
APPLICATION FILED MAR. 29, 1918.
1,377,812.
Patented May 10, 1921.
2 SHEETS—SHEET 1.
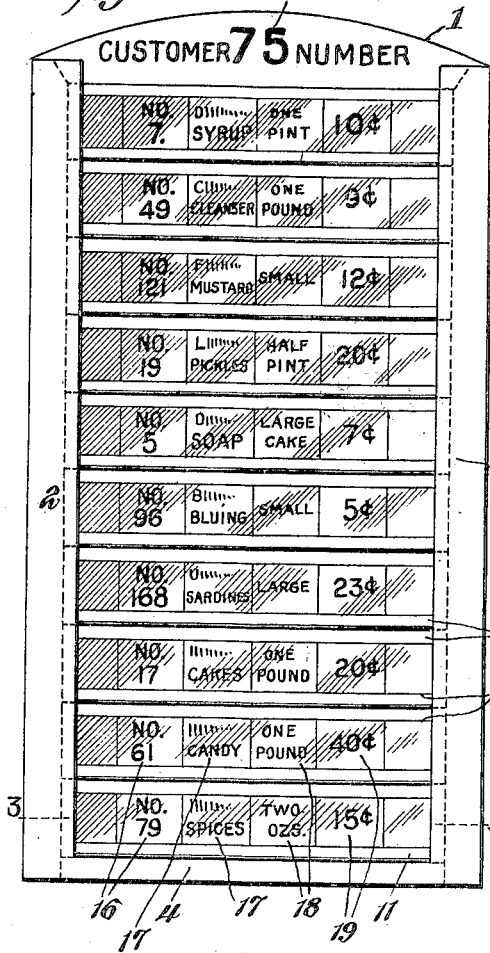
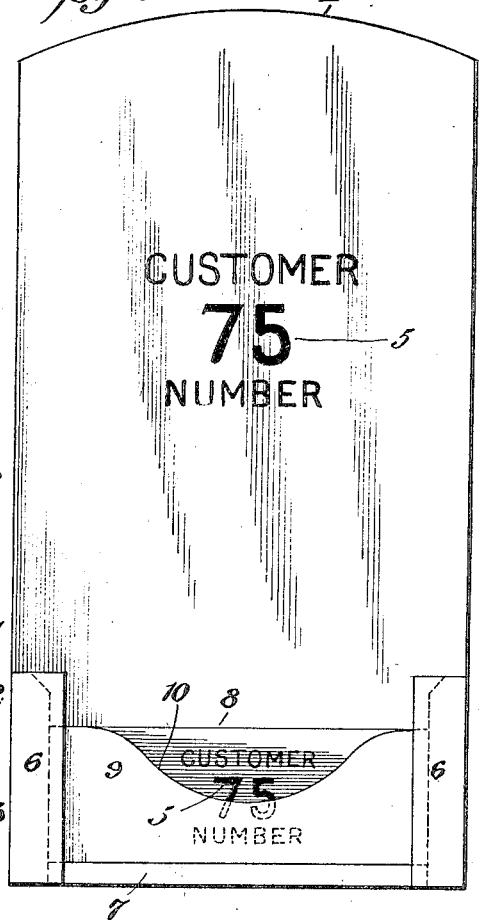
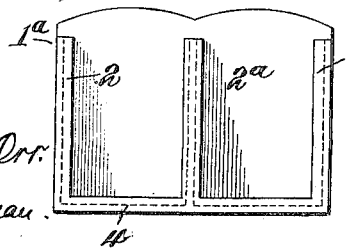
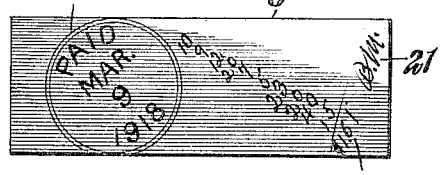
WITNESSES
Harry Dlugach, INVENTOR,
BY
ATTORNEY H. DLUGACH.
SHOPPING CARD FOR USE IN RETAILING GOODS BY SAMPLES.
APPLICATION FILED MAR. 29, 1918.
1,377,812.
Patented May 10, 1921.
2 SHEETS—SHEET 2.
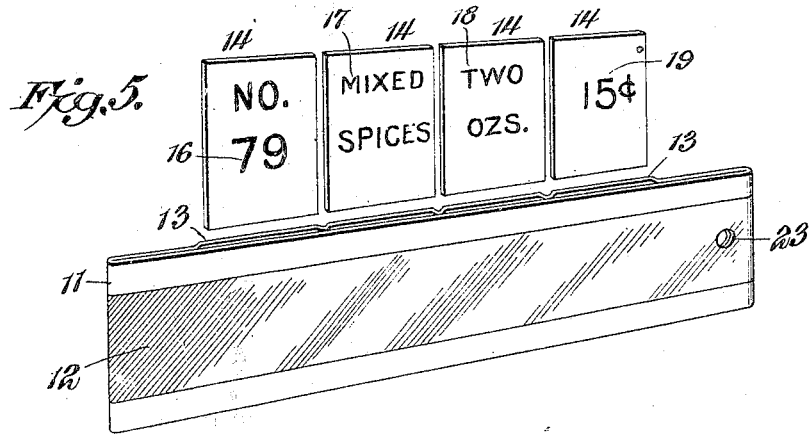
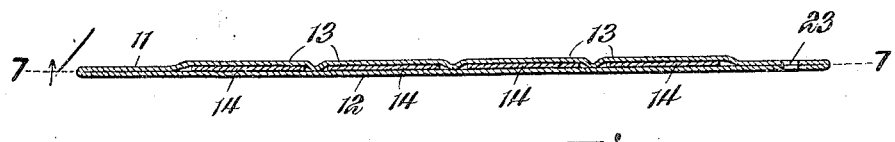
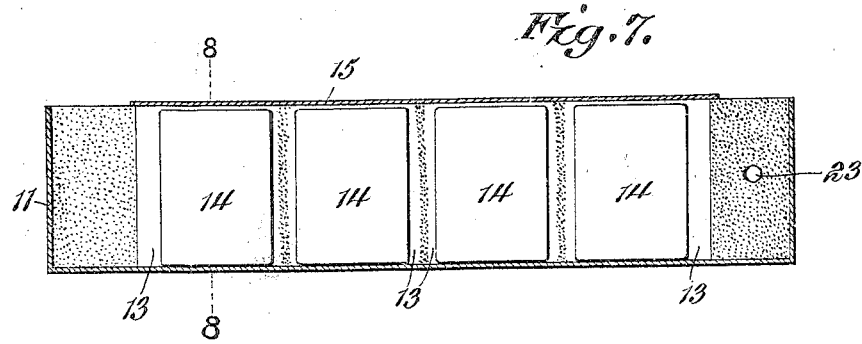
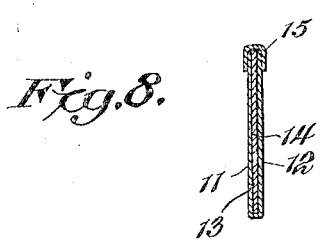
WITNESSES
Howard D. Orr
F. T. Chapman
Harry Dlugach, INVENTOR,
BY E. G. Siggers
ATTORNEY

UNITED STATES PATENT OFFICE.

HARRY DLUGACH, OF MEMPHIS, TENNESSEE.

SHOPPING-CARD FOR USE IN RETAILING GOODS BY SAMPLES.

1,377,812.  Specification of Letters Patent.  Patented May 10, 1921.

Application filed March 29, 1918. Serial No. 225,568.

*To all whom it may concern:*

Be it known that I, HARRY DLUGACH, a citizen of the United States, residing at Memphis, in the county of Shelby and State of Tennessee, have invented certain new and useful Improvements in Shopping-Cards for Use in Retailing Goods by Samples, of which the following is a specification.

This invention has reference to shopping or customer's card for retailing goods by sample, and its object is to provide a card capable of holding tickets descriptive of the goods chosen from samples thereof with the card arranged to identify the customer.

The invention is designed to be used in connection with a system of retailing goods by samples set forth in my application Serial Number 225,569, filed March 29, 1918, for system of and means for retailing goods by samples.

In the system referred to a customer is provided with or takes from an accessible supply thereof a card identifying the customer by a number or some other suitable indicia and chooses by displayed but non-accessible samples the goods wanted and then takes appropriate tickets from accessible supplies thereof associated with and individual to the samples and identifying the goods desired.

The card with the assembled tickets is presented to a cashier, the total cost ascertained and paid, a receipt given and the card is then turned over to a packer who assembles the goods and wraps them and delivers the goods on the presentation of a receipt made out upon a strip originally contained in the customer's card and also identifying the customer.

The shopping or customer's card is so constructed as to receive and hold the chosen tickets on one face and a slip upon which the receipt is made out, on the other face, the slip having a number or indicia corresponding to the identification number or indicia of the card, thus enabling the packer to deliver the proper bundle to the customer.

The card given up by the customer and containing the inserted tickets is utilizable for stock accounting while the receipts delivered by the customer to the packer are utilizable for cash accounting, thereby facilitating such accounting and reducing the cost thereof. The cards and tickets are subsequently distributed to the proper points for reuse and may be frequently so reused, thus reducing the cost and permitting the employment of a better quality of material than would otherwise be the case.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a front face view of a customer's or shopping card showing tickets inserted therein and designating the chosen articles desired.

Fig. 2 is a rear face view of the same card.

Fig. 3 is a section on the line 3—3 of Fig. 1, but omitting the tickets and the receipt strip.

Fig. 4 is a face view of the receipt strip showing the face opposite to that appearing in Fig. 2 and showing the receipt made out ready for delivery to the packer in exchange for the bundle of goods ordered.

Fig. 5 is a perspective view, on an enlarged scale, of a goods-identifying ticket or tickets and an envelop assembling and holding them and through which envelop the tickets are visible.

Fig. 6 is a longitudinal section through the envelop of Fig. 5, showing the tickets in place therein.

Fig. 7 is a section on the line 7—7 of Fig. 6.

Fig. 8 is a section on the line 8—8 of Fig. 7.

Fig. 9 is a face view of a duplex card.

Referring to the drawings, there is shown a card 1 which for convenience may be of elongated rectangular form, although such particular form is not obligatory. Along the long sides of the card on one face thereof are channels 2, that near one edge of the card facing the channel near the other edge of the card. The end constituting the bottom of the card and extending between the two channels has a stop strip 4 so that articles placed at the upper ends of the channels may be moved to the lower ends thereof and there held, the upper ends of the channels being open.

On the same face of the card containing the channels 2 is a number 5 having associated with it a suitable phrase such as "Customer number." It will be understood that the designating number, which in the particular instance shown is 75, is for the purpose of identifying the customer and hence may be replaced by any suitable indicia and the particular phrase used may be replaced by some other appropriate phrase.

On the opposite face of the card 1 the identifying indicia 5 and the associated descriptive phrase is repeated, and, for convenience of reading, may be printed in considerably larger type than that on the first named face of the card, it being understood that the words and numbering or other indicia which may appear on the card are printed thereon so as to relieve the customer from the necessity of making any marks on the card and to do away with the necessity of any clerks to make marks on the cards.

At the bottom portion of the second named face of the card 1 are edge channels 6 and a bottom strip 7 similar to the channels 2 and bottom strip 4. These channels and strip define a pocket in which is lodged a strip 8 of suitable length and width and which may be made of paper, the card and channel strips being usually made of card or other like board. Since the paper strip 8 is quite limber the pocket for it is provided with a front facing 9 with a cutaway portion 10 permitting the ready grasping of the strip 8 without liability of the latter escaping from the pocket accidentally.

For identifying those goods desired by the customer and chosen from the display of samples there is provided an elongated envelop 11 with a facing 12 of suitable material sufficiently transparent to read printed matter therethrough. Within the envelop is a series of pockets 13 each primarily open at one end and permanently closed at the other and these pockets receive and lodge ticket units 14 which may be secured in the pockets by a sealing strip 15 secured over the primarily open ends of the pockets. The envelop 11 and units 14 make up an identification ticket individual to the goods represented by a sample or group of like samples and sufficient units are assembled to give desirable information with respect to the goods. For instance, one unit 14 may contain a number 16 or other indicia helpful to the packer and others in assembling the order. Another unit 14 may contain a word or words 17 descriptive of the kind of material represented by the sample. On another unit a word or words 18 or other expression may designate the amount of material represented by the sample and on another unit 14 are suitable indicia 19 showing the selling price of the goods represented by the sample.

The ticket units with the exception of the one containing indicia 16 may not be needed for the packer but the other units with the matter thereon are helpful to the customer, the unit with the selling price thereon being useful to the cashier. Certain of the information on each ticket may become useful to the packer or to an inspector in checking up the order and subsequently for accounting.

When the goods-identification tickets are assembled in a card 1 the identification numbers or indicia 16 become arranged in a column easily read by the person assembling and packing the goods. Also the price designations become automatically arranged in a column, thereby facilitating the addition of prices to ascertain the total amount which must be paid. These amounts may also be transferred by the cashier to the strip 8 and the total placed thereon, as shown at 20, in Fig. 4, and for further identification the cashier's initial may be added to the strip 8, as indicated at 21, in Fig. 4. In order that the strip may serve as a receipt for the customer showing that the amount has been paid, a paid stamp may be impressed on the sheet 8, as shown at 22, in Fig. 4. Those designations apearing on the face of the strip 8, visible in Fig. 4, are not originally present but are placed thereon by the cashier after the card 1 is presented by the cashier. The other side of the strip 8 has printed thereon the customer's identification mark which corresponds to that on the card 1 so that the customer may, upon presentation of the strip 8 properly receipted, receive the package of goods.

The tickets made up of the envelops 11 and units 14 may each represent but one article, as shown by a sample, but if two or more like articles are desired, then two or more like tickets may be placed in the card 1. It is also feasible to arrange certain of the tickets to include two or more like articles represented by the same sample so that if a customer desires more than one article the ticket representing the desired multiple of the article may be chosen, the descriptive legend 18 appearing accordingly and the price mark 19 corresponding.

It is quite feasible to have the units 14 of the tickets of different colors to represent different parts of the store or display room or different parts of the storage room to thereby facilitate the handling of the goods, such features not necessarily meaning anything to a customer.

A shopping or customer's card, such as shown in Figs. 1, 2, and 3, may answer for many customers but there are times when a customer desires to make more extended purchases than would be provided for by the card of Fig. 1. For this reason cards 1ª, such as shown in Fig. 9, may be used, these cards being sufficiently wide to accommodate two upright rows of tickets separated by an intermediate channel member 2ª, thus doubling the capacity of the card. An extension of the same idea to three or more columns might be adopted.

Each envelop 11 may be provided near one end with a perforation 23 by means of which the ticket may be hung upon a hook with other tickets of like character so as to be within easy reach of a customer and closely associated with the goods which the ticket is to represent.

What is claimed is:

1. Means for use in selling goods at retail by sample, comprising a holder of a size to be carried in the hand of a customer, and tickets each adapted to be inserted and displayed in the holder and individualized to and identifying the goods represented by a sample, the holder being constructed to receive a plurality of said tickets all visible at the same time and in orderly arrangement.

2. Means for use in selling goods at retail by sample, comprising tickets descriptive of and individualized to samples of the goods for sale, a holder for the tickets of a size to be carried in the hand of a customer, and a receipt slip also carried by the holder, both holder and receipt slip carrying indicia for identifying the customer.

3. Means for use in selling goods at retail by sample, comprising tickets having matter thereon descriptive of and individualized to samples of the goods for sale, a holder for the tickets of a size to be carried in the hand of a customer, and a receipt slip also carried by the holder, both holder and receipt slip having indicia thereon for identifying the customer carrying the holder, the tickets being deposited in one face of the holder, and the receipt slip on the opposite face.

4. Means for use in selling goods at retail by sample, comprising a card constructed to constitute a holder and provided with indicia identifying a customer possessing the card, said card being of a size to be carried in the hand of the customer, and tickets adapted to the holder for insertion therein with all visible at the same time and in orderly arrangement, each ticket having the descriptive matter thereon individualizing it to a certain sample.

5. Means for use in selling goods at retail by sample, comprising a card constructed to constitute a holder and provided with arbitrary indicia for identifying a customer possessing the card, said card being of a size to be carried in the hand of the customer, and tickets arranged for insertion in the holder to be visibly displayed simultaneously in orderly arrangement one above another, each ticket containing matter descriptive of the goods represented by a sample, and individualizing the ticket to the sample, the descriptive matter on the ticket including the price of the goods, the price on all the tickets being located at the same point, whereby when the tickets are in the holder, the price marks on the several tickets contained therein are arranged in column order.

6. Means for use in selling goods at retail by sample, comprising a card constructed to constitute a holder and provided with arbitrary indicia for identifying a customer possessing the card, said card being of a size to be carried in the hand of the customer, and tickets arranged for insertion in the holder to be visibly displayed simultaneously one above another, each ticket containing matter descriptive of the goods represented by a sample and individualizing the ticket to said sample, the descriptive matter on the ticket including the price, the number of the sample, the name and quantity all of which are arranged in the same order or location on each ticket whereby when placed in the holder, the matter on the several tickets becomes automatically arranged in separate columns.

7. Means for use in selling goods at retail by sample, comprising a shopping card provided with arbitrary indicia for identifying a customer possessing the card, said card being of a size to be carried in the hand of the customer, holding channels on the front face of the card, tickets descriptive of and individualized to samples of the goods for sale adapted to be placed in said channels in orderly arrangement with all visible at the same time, holding channels on the back face of the card of less length than those on the front face, and a blank receipt slip adapted to be received in the last-mentioned channels and having identifying indicia corresponding to that on the card.

8. Means for use in selling goods at retail by sample, comprising a holding device for use by a customer of a size to be carried in the hand of the customer, and tickets with matter thereon individualizing the tickets to samples of the goods, and said tickets being adapted for insertion in the holder, each ticket including an envelop through which the descriptive matter of the ticket may be read.

9. Means for use in selling goods at retail by sample, comprising a holding device for use by a customer, and tickets with matter thereon individualizing the tickets to samples of the goods and said tickets being adapted for insertion in the holder, each ticket including an envelop through which the descriptive matter of the ticket may be read, said envelop having a series of pockets therein and the descriptive portion of the ticket being made up of a series of units each with a part of the descriptive matter thereon and located in a respective pocket.

10. Means for use in selling goods at retail by sample, including a ticket device containing descriptive matter individualizing the ticket to the goods represented by a sample, said ticket structure comprising an envelop with compartments therein and ticket units each insertible in a compartment in the envelop, and each unit containing a different part of the descriptive matter of the ticket as a whole, with the envelop where covering the descriptive mater of a character whereby the descriptive matter is visible.

11. Means for use in selling goods at retail by sample, including a ticket device containing descriptive matter individualizing the ticket to the goods represented by a sample, said ticket device comprising an envelop with compartments therein, and ticket units each insertible in a compartment of the envelop, each ticket unit containing a different part of the descriptive matter of the ticket as a whole, that portion of the envelop covering the descriptive matter being made transparent, each compartment in the envelop being open at one end only, and means for closing the open ends of said compartments.

In testimony whereof I affix my signature.

HARRY DLUGACH.